Feb. 13, 1934.  A. STOLL  1,946,820
COUPLING MECHANISM FOR NUTS AND WASHERS
Filed July 13, 1932  3 Sheets-Sheet 1

Inventor
ALBERT STOLL

By
Attorney

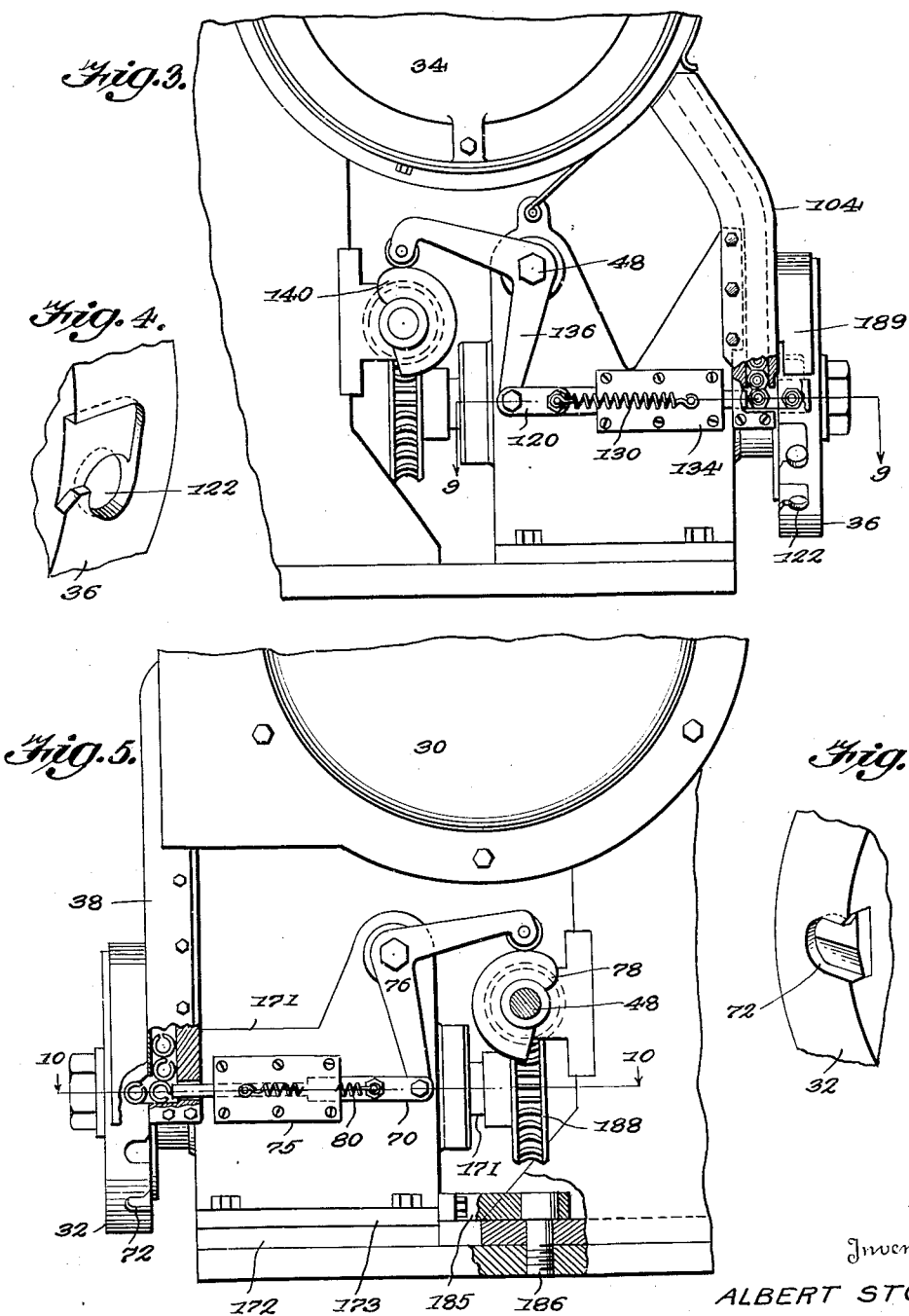

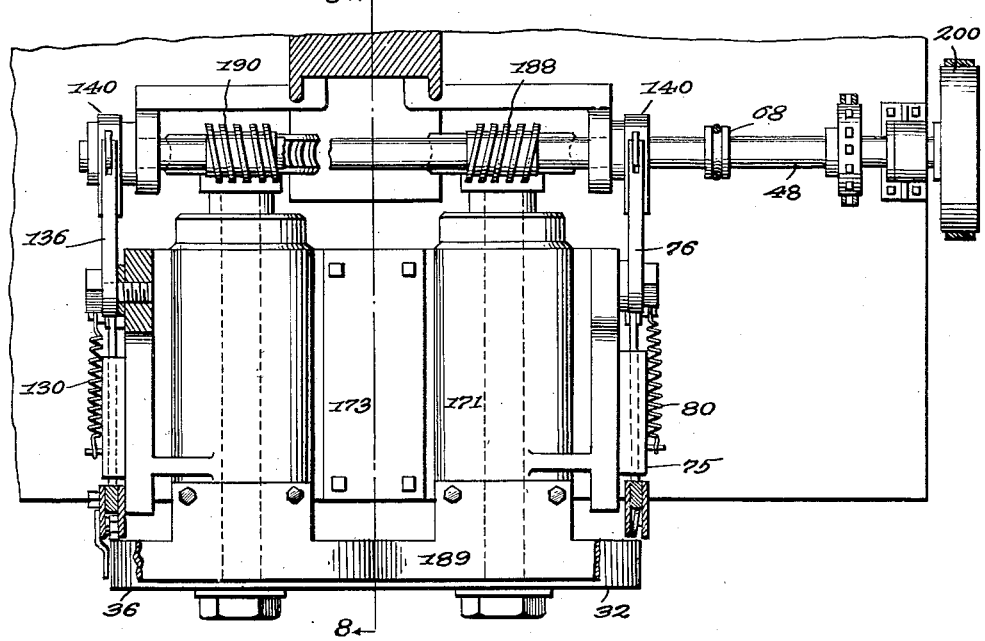
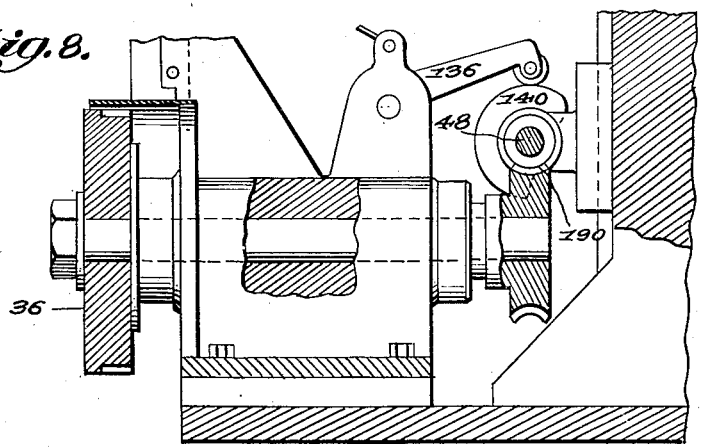
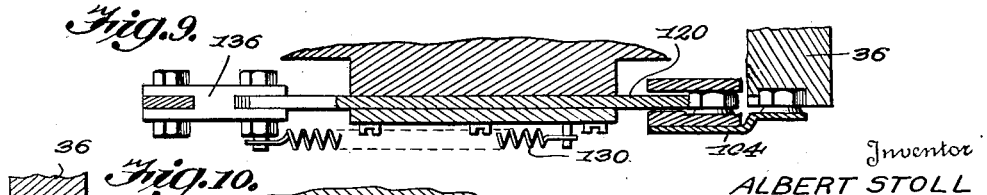
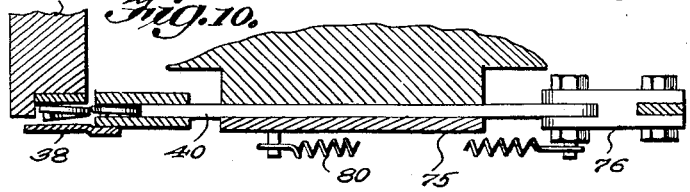

Patented Feb. 13, 1934

1,946,820

UNITED STATES PATENT OFFICE 1,946,820

COUPLING MECHANISM FOR NUTS AND WASHERS

Albert Stoll, Detroit, Mich., assignor to National Machine Products Company, Detroit, Mich., a corporation of Michigan Application July 13, 1932. Serial No. 622,343

14 Claims. (Cl. 29—84)

This invention relates to coupling mechanisms for use in connecting nuts and washers to allow these parts to be handled together as units.

An important aim of the invention is to provide simple and expeditious means by which lock washers may be coupled to especially designed nuts to allow these parts to be handled as units and in more specifically adverting to this, it is pointed out that, in the practice of the invention, each washer is brought to a tangency with the nut to which it is to be coupled to establish an initial interlocking connection between the washer and an annular protuberance or skirt of the nut so that the subsequent application of endwise pressure to the nut and the washer causes the washer to spread radially and to slip over the protuberance to closely embrace the same, with the result that the washer is firmly coupled to the nut and will remain securely in place while being handled thereby avoiding the inconvenient delays incident to handling separate lock washers and nuts.

The timing mechanism by which the nuts and washers are brought together in the proper order will also be found to form an important part of the invention.

Provision is further made for the passage of over-sized or imperfect washers and nuts so that, although such over-sized or imperfect washers and nuts as may be encountered will not be coupled to mating parts, the same will be prevented from obstructing the operation of the machine or damaging any of the parts thereof.

Other objects and advantages will be apparent during the course of the following description.

Figure 1:
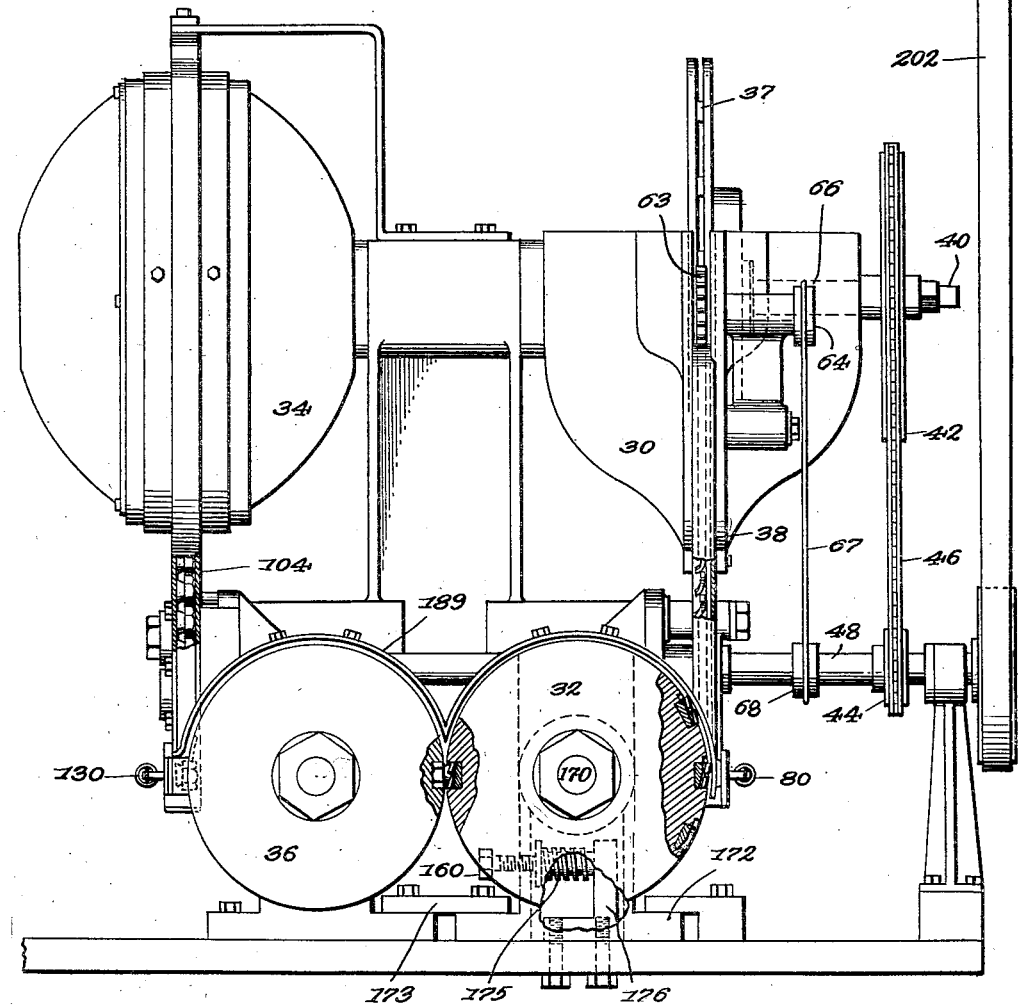
Figure 2:
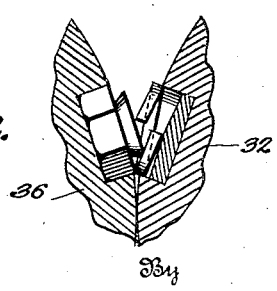

In the accompanying drawings, forming a part of this application and in which like numerals are employed to designate like parts throughout the same, Figure 1 is a front elevation of the improved coupling mechanism, parts being shown in section, Figure 2 is a detailed sectional view through a pair of coupling discs or elements embodied in the invention, the view illustrating the manner in which the nuts and washers are brought to a tangency so that the washers may be slipped over special coupling skirts or protuberances of the nuts, Figure 3 is a fragmentary side elevation of the machine, the view illustrating the nut feeding side of the machine and the means by which the supply of nuts is timed, Figure 4 is a fragmentary perspective of the nut carrying disc, the view illustrating one of the nut receiving pockets, Figure 5 is a fragmentary side elevation of the machine, the view illustrating the washer feeding mechanism and the means by which the supply of washers to the nut carrying means is timed, Figure 6 is a fragmentary perspective of the washer carrying disc, Figure 7 is a fragmentary plan view of the machine, Figure 8 is a vertical sectional view taken on line 8—8 of Figure 7, Figure 9 is a detail horizontal sectional view taken on line 9—9 of Figure 3, Figure 10 is a detailed horizontal sectional view taken on line 10—10 of Figure 5.

By way of specific reference to the drawings, attention is invited to Figure 1, in which it is illustrated that a washer hopper 30 is located above and in feeding relation to a washer carrier 32, while a nut hopper 34 is located above and in feeding relation to a nut carrier 36, the relation to each other of the carriers 32 and 36 being such, that the washers and nuts, respectively, carried by these parts are permanently coupled.

As suggested in Figure 1, a rotatable washer feeding wheel 37 is moutned within the hopper 30 and is rotated toward what might be said to be the front side of the machine to furnish the washers to a magazine 38. The washer feeding wheel 37 is mounted upon a shaft 40 upon which there also is mounted a sprocket wheel 42 joined with a sprocket wheel 44 through the intervention of a sprocket chain 46, the sprocket wheel 44 being keyed or otherwise secured upon what might be said to be a main drive shaft 48.

Figure 1 also illustrates that a spill wheel 63 is positioned for rapid rotation in a counter-clockwise direction immediately above the inlet to the magazine 38 and serves to return surplus washers to the hopper. The periphery of the spill wheel may be formed with rather short teeth or any other means for engaging the surplus washers and directing the same back into the hopper.

The spill wheel 63 is mounted upon a motion transmitting shaft 64 and upon this shaft there is also mounted a pulley 66. A motion transmitting belt 67 is trained about the pulley 66 and about a second pulley 68, the latter pulley being mounted upon the drive shaft 48 to turn therewith.

It is illustrated in Figure 5 that the lower or outlet end of the magazine 38 is intersected by a longitudinally movable plunger 70 by which the washers are transferred individually from the magazine to the washer carrier disc 32. More specifically, the individual washers are moved on edge from the magazine into radial sockets 72 in the disc 32. The sockets 72 open out through the magazine side of the disc 32 and the advance side wall of the sockets are shown to be angled to provide a large entrance opening to the sockets. This is necessitated by the fact that the transfer of the washers from the magazine to the disc 32 may be started before a particular socket is directly in line with the plunger 70. The plunger 70 is movable through a guide 75 and has operative connection with a bell crank 76, one arm of the bell crank being provided with a roller riding upon a cam 78. It is believed to be clear, with reference to Figure 5, that the rotation of the cam 78 will intermittently rock the bell crank 76 to retract the plunger 70 and that after each retraction of the plunger, the cam will free the bell crank so that a contractile coil spring 80 is allowed to advance the plunger and thereby bring about the transfer of an individual washer from the magazine 38 to the disc 32.

The contractile coil spring 80 is anchored at one end to the retaining member 75 and at the other end to what might be said to be the rear portion of the plunger 70. The cam 78 is shown in Figure 5 to be mounted upon the drive shaft 48 to turn therewith.

Referring now to the means by which the nuts are handled for presentation to the nut carrier 36, attention is invited to Figure 1, in which it is shown that the hopper 34 is rotatably mounted so that the nuts therein are turbulated and presented to the magazine 104, the hopper mechanism forming no special part of this invention and being fully disclosed in co-pending application Serial No. 509,259, filed January 16, 1931, by Clare L. Brackett, other parts of the herein disclosed mechanism also being shown in the co-pending application.

As shown in Figure 3, the lower or outlet end of the nut conducting magazine 104 is intersected by a horizontally movable plunger 120 and it is through the medium of this plunger that the nuts are transferred individually from the magazine to the nut carrier coupling element 36. More specifically, the nut carrier 36 is shown to be in the nature of a disc having peripheral radial sockets 122 opening laterally through the magazine side of the disc for registration with the outlet from the magazine. When the sockets are thus brought into registration with the outlets from the magazine 104, the plunger 120 is advanced to bring about the lateral movement of the nuts from the magazine into the sockets. Of course, as viewed in Figure 1, the nut carrier 36 is turned in a clockwise direction and now, by reference to Figure 4 it will be seen that the approach sides of the sockets 122 are slightly flared or widened to allow of the easy movement of the nut into the sockets.

The plunger 120 is advanced into engagement with the nut through the action of a contractile coil spring 130, one end of which is anchored to the plunger guide 134, while the other end thereof is anchored to what might be said to be the rear portion of the plunger 120.

The rear portion of the plunger 120 also has connection with the lower branch of a bell crank 136 while the upper or nearly horizontal branch of the bell crank is provided with a roller riding upon the lobe of a cam 140. Clearly, rotation of the cam 140 rocks the bell crank 136 to retract the plunger 120 and when the lobe of the cam 140 rides beyond the bell crank 136 the spring 130 will be allowed to contract and thereby advance the plunger for the transfer of a nut from the magazine to the carrier 36.

With reference to Figure 3, it will be seen that the cam 140 is mounted upon the shaft 48 upon which the cam 78 is also mounted, so that the transfer of nuts and washers from the magazines thereof to the associated carriers is in regulated order.

Referring now to the actual coupling of the washers and nuts, attention is invited to Figure 1, illustrating that as a result of rotation of the disc 32 in a counter-clockwise direction, in synchronism, of course, the washers and nuts are brought to a tangency so that the skirts of the nuts are caused to wedge between the inner side walls of the washers and spread the washers and continued turning of the discs 32 and 36 will complete the union of the washers and the nuts. Any suitable means such as a receptacle, may be provided below the coupling discs to receive the coupled nuts and washers.

Provision is made for the passage of over-sized or imperfect nuts between the discs 32 and 36 without damage to any of the parts of the machine and in explaining this, it is pointed out that the supporting shaft 170 for the disc 32 is rotatably extended thru a bearing member or carrier 171, the latter having spaced laterally projecting base flanges 172 held movably by gibs 173. Of course, the laterally projecting flanges 172 are free for lateral movement beneath the gibs 173.

An expansion spring 175 is shown to be confined between a fixed abutment member 176 and a set screw 160, the latter being threaded through one side wall of the carrier 171 and furnishing a means by which the effective strength of the spring 175 may be varied.

It is believed to be clear that by advancing the set screw 160, the expansive force of the spring 175 is increased to urge the disc 32 with increased force in the direction of the nut carrying disc 36. On the other hand, by retracting the set screw 160, the effective force of the spring 175 is diminished so that the disc 32 is rendered highly responsive to the passage of over-sized or imperfect nuts and washers between the discs 32 and 36.

Thus, the movable mounting of the carrier 171 upon the base of the machine allows the disc 32 to yield under the influence of over-sized or imperfect nuts to the end that damage to the discs or other parts of the machine is avoided.

By reference to Figure 5 it will be seen that the carrier 171 is provided at what might be said to be the rear side thereof, with a sort of arm 185, resting flatly upon the base of the machine and secured thereto by a pivot pin 186, the pivot pin being located directly below the worm and worm wheel connection 188 of the shafts 48 and 170. This pivotal connection 186 allows a limited yielding of the disc 132 for the passage of imperfect or over-sized nuts and washers without disturbing the driving connection 188. More specifically, the axis of the pivot element 186 intersects the driving connection 188 and extends at right angles to the shaft 48.

Figure 1 illustrates that a guard 189 is positioned above the discs 32 and 36 to hold the washers and the nuts in place while being conducted from the loading to the coupling positions. The guard 189 may be in the form of two approximately semi-circular portions overhanging the discs 32 and 36 in spaced relation to these parts and joined at their meeting ends.

Referring now to Figure 7, it will be seen that the disc 36 is mounted upon a shaft having driving connection with the drive shaft 48 through the intervention of a worm and worm wheel connection 190, and since the ratios of the driving connections 188 and 190 are the same, the rotation of the discs 32 and 36 will be regulated for the orderly coupling of the washers and nuts.

Furthermore, since the cams 78 and 140 are mounted upon the main drive shaft 48 the feed of the washers and the nuts to the coupling discs will be timed to the speed of operation.

In carrying out the invention any suitable means may be employed to connect the drive shaft 48 to a source of power and for the purpose of illustration I have shown a wheel 200 keyed in any suitable manner to one end of the shaft 48 so that a driving belt 202 extending from a suitable source of power may be trained about the same.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. In a mechanism for coupling nuts and washers, a pair of rotatable carriers arranged in edge to edge relation and having nut and washer conducting means, feeding devices to furnish nuts and washers to said rotatable carriers, and retaining devices associated with said carriers.

2. In a mechanism for coupling nuts and washers, a pair of rotatable carriers having opposed surface portions in nut and washer coupling relation, one of the surface portions being provided with nut conducting means and the other surface portion being provided with washer conducting means, and a feeding device to furnish nuts and washers to the respective nut and washer conducting means.

3. In a mechanism for coupling nuts and washers, a pair of rotatable carriers having opposed surface portions in nut and washer coupling relation, one of the surface portions being provided with nut conducting means and the other surface portion being provided with washer conducting means, a feeding device to furnish nuts and washers to the respective nut and washer conducting means, and means supporting one of the carriers for shifting movement with respect to the other carrier under the influence of irregularly dimensioned nuts.

4. In a mechanism for coupling nuts and washers, a pair of rotatable carriers having opposed surface portions in nut and washer coupling relation, one of the surface portions being provided with nut conducting means and the other surface portion being provided with washer conducting means, a feeding device to furnish nuts and washers to the respective nut and washer conducting means, means supporting one of the carriers for shifting movement with respect to the other carrier under the influence of irregularly dimensioned nuts, and a tensioning device yieldingly maintaining nut and washer coupling relation between said carriers.

5. In a mechanism for coupling nuts and washers, a pair of rotatable carriers having opposed surface portions in nut and washer coupling relation, one of the surface portions being provided with nut conducting means and the other surface portion being provided with washer conducting means, and a movable pivoted support for one of said carriers, and spring means yieldingly maintaining nut and washer coupling relation between said carriers.

6. In a mechanism for coupling nuts and washers, a pair of rotatable carriers having opposed surface portions normally in nut and washer coupling relation, one of the surface portions being provided with nut conducting means and the other surface portion being provided with washer conducting means, a movable pivoted support for one of said carriers, and spring means associated with said movable pivoted support for yieldingly maintaining nut and washer coupling relation between said rotatable carriers.

7. In a mechanism for coupling nuts and washers, a pair of rotatable carriers having opposed portions in nut and washer coupling relation, one of said portions having nut conducting means and the other portion having washer conducting means, a shiftable support for one of said carriers, a pivot element about which said shiftable support swivels, and a motion transmitting connection in line with the longitudinal axis of said pivot elements and having driving connection with the carrier mounted on said shiftable support.

8. In a mechanism for coupling nuts and washers, a pair of rotatable carriers having opposed portions in nut and washer coupling relation, one of said portions having nut conducting means and the other portion having washer conducting means, a shiftable support for one of said carriers, a pivot element about which said shiftable support swivels, a motion transmitting connection in line with the longitudinal axis of said pivot element and having driving connection with the carrier mounted on said shiftable support, and spring means associated with said shiftable support and yieldingly maintaining nut and washer coupling relation between the carriers.

9. In a mechanism for coupling nuts and washers, a pair of rotatable carriers having portions provided respectively with nut and washer conducting means, said portions being in opposed relation to bring the nuts and washers carried thereby to tangencies whereby the nuts and washers are coupled.

10. In a mechanism for coupling nuts and washers, a pair of disk shaped rotatable carriers having opposed peripheral portions in nut and washer coupling relation, said peripheral portions being provided respectively with nut and washer conducting means, said portions being in opposed relation to bring the nuts and washers carried thereby to tangencies whereby the nuts and washers are coupled.

11. In a mechanism for coupling nuts and washers, a pair of rotatable carriers having sockets adapted respectively for the reception of nuts and washers and forming a nut and washer conducting means, said sockets in the peripheral portions of the carriers being in opposed relation to bring the nuts and washers carried thereby to tangencies whereby the nuts and washers are coupled.

12. In a mechanism for coupling nuts and washers, a pair of rotatable carriers having sockets adapted respectively for the reception of nuts and washers and forming nut and washer conducting means, said sockets in the peripheral portions of the carriers being in opposed relation to bring the nuts and washers carried thereby to tangencies whereby the nuts and washers are coupled, and feeding devices for feeding nuts and washers respectively to the sockets.

13. In a mechanism for coupling nuts and washers, a pair of rotatable carriers having sockets adapted respectively for the reception of nuts and washers and forming a nut and washer conducting means, said sockets in the peripheral portions of the carriers being in opposed relation to bring the nuts and washers carried thereby to tangencies whereby the nuts and washers are coupled, feeding devices for feeding nuts and washers respectively to the sockets, and a common drive means for operating the feeding devices and said carriers in synchronism.

14. In a mechanism for coupling nuts and washers, a pair of rotatable carriers having peripheral portions provided respectively with nut and washer receiving sockets having entrance openings extended out through the sides of the carriers, said sockets forming respectively nut and washer conducting means, and feeding devices for feeding said nuts and washers respectively through said entrance openings to said sockets, said carriers being rotatable in opposite directions to bring the nut and washer receiving sockets therein into oposed relation whereby the nuts and washers carried thereby are moved to tangencies to couple the nuts and washers.

ALBERT STOLL.